United States Patent
Chen et al.

(10) Patent No.: US 11,097,456 B2
(45) Date of Patent: Aug. 24, 2021

(54) PREPARATION METHOD FOR HOLLOW RADIATOR AND HOLLOW RADIATOR

(71) Applicant: Shenzhen Future Technology Co., Ltd, Shenzhen (CN)

(72) Inventors: Mingke Chen, Shenzhen (CN); Fong Seng Lim, Shenzhen (CN); Kia Gie Foo, Shenzhen (CN)

(*) Notice: Subject to any disclaimer, the term of this patent is extended or adjusted under 35 U.S.C. 154(b) by 0 days.

(21) Appl. No.: 16/021,747

(22) Filed: Jun. 28, 2018

(65) Prior Publication Data
US 2019/0389101 A1 Dec. 26, 2019

(30) Foreign Application Priority Data
Jun. 21, 2018 (CN) .......................... 201810641453.0

(51) Int. Cl.
*B22F 3/00* (2021.01)
*B29C 45/14* (2006.01)
(Continued)

(52) U.S. Cl.
CPC ...... *B29C 45/14008* (2013.01); *B22F 3/1021* (2013.01); *B29C 45/0001* (2013.01); *B29C 45/0013* (2013.01); *B29C 71/02* (2013.01); *F28F 1/00* (2013.01); *F28F 21/08* (2013.01); *B22F 2201/013* (2013.01); *B22F 2301/10* (2013.01); *B22F 2302/45* (2013.01); *B29K 2091/00* (2013.01); *B29K 2423/06* (2013.01);
(Continued)

(58) Field of Classification Search
CPC .................................................... B22F 3/1021
See application file for complete search history.

(56) References Cited

U.S. PATENT DOCUMENTS

2013/0101456 A1* 4/2013 Danninger ............ B22F 3/1021
419/30

FOREIGN PATENT DOCUMENTS

| CN | 102351542 A | * | 2/2012 |
| CN | 102351542 A | | 2/2012 |
| CN | 105798308 A | | 7/2016 |

OTHER PUBLICATIONS

Johnson et al, Evaluation of copper powders for processing heat sinks by metal injection moulding, 2005, Powder Metallurgy, vol. 48, No. 2, pp. 123-128 (Year: 2005).*

(Continued)

*Primary Examiner* — Timothy Kennedy
(74) *Attorney, Agent, or Firm* — HYIP

(57) ABSTRACT

The present invention discloses a preparation method for a hollow radiator and a hollow radiator. The preparation method comprises the following steps: 1) providing a feed and an insert raw material; 2) molding the insert raw material into an insert; 3) placing the insert in a cavity of a mold, and filling the cavity with the feed by injection molding in such a manner that the insert is surrounded by the feed, thereby obtaining a green body with the insert; 4) performing debinding treatment on the green body with the insert to remove the insert, thereby obtaining the green body of a hollow structure; and 5) sintering the green body to obtain the hollow radiator. By the preparation method for a hollow radiator according to the present invention, a radiator of a complex hollow structure can be fabricated, and the heat dissipation effect of the radiator can be improved. Moreover, the airtightness and leakproofness of the radiator can be guaranteed for a long time.

9 Claims, 1 Drawing Sheet

(51) Int. Cl.
*B22F 3/10* (2006.01)
*B29C 45/00* (2006.01)
*B29C 71/02* (2006.01)
*F28F 1/00* (2006.01)
*F28F 21/08* (2006.01)
*B29K 91/00* (2006.01)
*B29K 423/00* (2006.01)
*B29L 23/00* (2006.01)
*B29L 31/18* (2006.01)

(52) U.S. Cl.
CPC ....... *B29K 2423/12* (2013.01); *B29L 2023/22* (2013.01); *B29L 2031/18* (2013.01)

(56) References Cited

OTHER PUBLICATIONS

Nishiyabu, Micro Metal Powder Injection Molding, 2012, Some Critical Issues for Injection Molding, Ed. Wang, IntechOpen, pp. 105-130 (Year: 2012).*

Supati et al, Mixing and characterization of feedstock for powder injection molding, 2000, Materials Letters, 46, pp. 109-114 (Year: 2000).*

"Method for calculating the engineering quantity list of water heating and electric equipment", Compilation group of "Method for calculating the engineering quantity list of water heating and electric equipment", China Building Materials Industry Press, p. 315, Published in China on Jul. 31, 2014.

"Copper and copper alloy powder and products", Edited by Wang, Limin, Central South University Press, pp. 206-210, Published in China on Dec. 31, 2010.

* cited by examiner

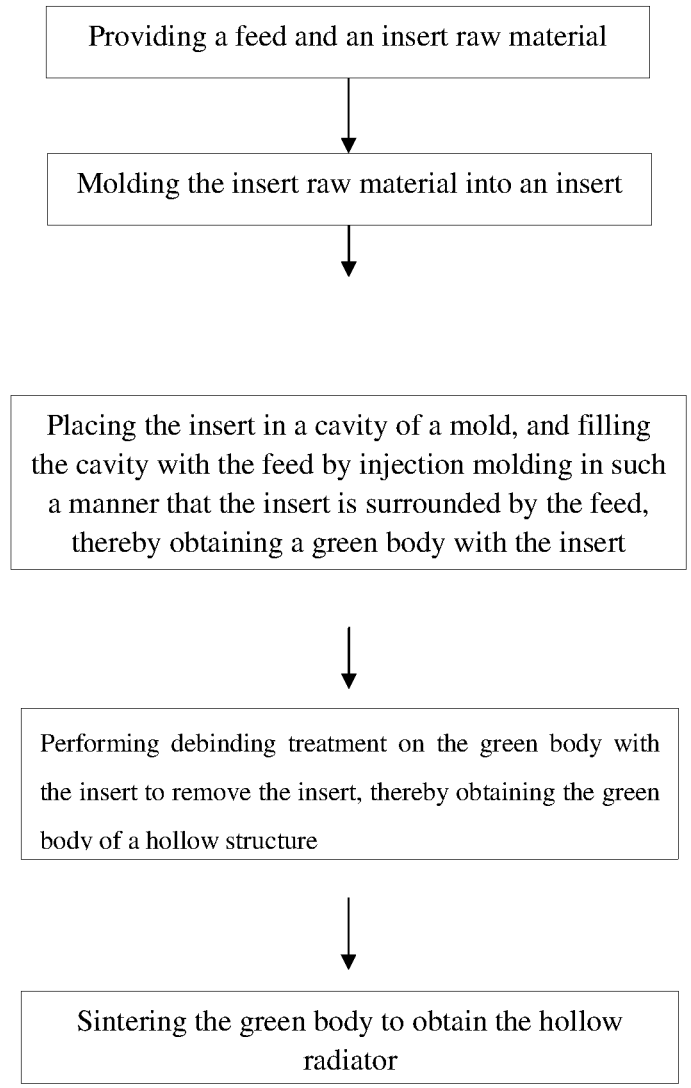

PREPARATION METHOD FOR HOLLOW RADIATOR AND HOLLOW RADIATOR

TECHNICAL FIELD

The present invention relates to the field of radiators, and more particularly to a preparation method for a hollow radiator and the hollow radiator prepared by the method.

BACKGROUND ART

The production technique of Metal Injection Molding (MIM), which is a near net shape technique for manufacturing high-quality precision parts, has unmatched advantages over conventional powder metallurgy, machining and precision casting methods, and thus has been extensively used in metal molding in recent years.

A radiator is used to transfer and release heat. A traditional radiator may have a poor heat dissipation effect. Moreover, the manufacturing process of the traditional radiator cannot meet technical requirements, which is mainly manifested in two aspects: the heat unsatisfied heat dissipation effect and failure in preventing breakage and water leakage for a long time due to brazing. Hence, it is great significance to develop a new process of preparing a radiator.

SUMMARY OF THE INVENTION

For the above purpose, an objective of the present invention is to provide a preparation method for a hollow radiator and a hollow radiator. By the preparation method, a radiator of a complex hollow structure can be fabricated, and the heat dissipation effect of the radiator can be improved. Moreover, the airtightness and leakproofness of the radiator can be guaranteed for a long time.

To achieve the above objective, the present invention provides a preparation method for a hollow radiator. The preparation method comprises the following steps:
1) providing a feed and an insert raw material;
2) molding the insert raw material into an insert;
3) placing the insert in a cavity of a mold, and filling the cavity with the feed by injection molding in such a manner that the insert is surrounded by the feed, thereby obtaining a green body with the insert;
4) performing debinding treatment on the green body with the insert to remove the insert, thereby obtaining the green body of a hollow structure; and
5) sintering the green body to obtain the hollow radiator.

In some examples of the present invention, the feed in the step 1) is obtained by mixing a metal powder and a binder under the conditions of a rotating speed of 20-30 r/min and a temperature of 170-200° C. for 2-4 hours; and the volume content of the metal powder in the feed ranges from 55% to 65%.

In some examples of the present invention, the step 1) further comprises extruding the feed twice into a flake shape and a bar shape, thereby obtaining granules.

In some examples of the present invention, the metal powder is Cu powder, with a particle size of the Cu powder ranging from 30 to 50 um; and the binder is at least one selected from paraffin wax, beeswax, high-melting-point polyethylene, low-melting-point polyethylene, polypropylene, polystyrene, polyformaldehyde, and ethyl acetate.

In some examples of the present invention, the insert raw material is polyformaldehyde (POM), polymethyl methacrylate (PMMA), or polystyrene (PS); and molding the insert raw material into the insert by an injection molding process in the step 2) further comprises drying the insert raw material at 80-90° C. for 2-4 hours before molding the insert raw material into the insert.

In some examples of the present invention, the debinding treatment in the step 4) is catalytic debinding treatment; a catalyst used in the catalytic debinding treatment is oxalic acid; a temperature for the catalytic debinding treatment ranges from 120 to 135° C.; and a speed of feeding the catalyst is 2-3 g/min.

In some examples of the present invention, a solvent debinding treatment is also included before the catalytic debinding treatment; a solvent used in the solvent debinding treatment is alcohol, dichloromethane, or ethyl acetate; and the solvent debinding treatment is performed at a temperature of 20-30° C. for 48-56 hours.

In some examples of the present invention, in the step 5), the green body is sintered in hydrogen atmosphere to obtain the hollow radiator; the pressure of the hydrogen atmosphere ranges from 50 to 86 KPa; and the highest temperature of sintering ranges from 980 to 1050° C.

In some examples of the present invention, the sintering comprises heating the green body to 600° C. and maintaining the temperature for 60-90 minutes first, heating the green body to 800° C. and maintaining the temperature for 60-90 minutes afterwards, then heating the green body to 950° C. and maintaining the temperature for 30-60 min, and finally, heating the green body to the highest temperature and maintaining the temperature for 60-120 min, and naturally cooling the green body to room temperature.

In addition, the present invention also provides a hollow radiator, which is obtained by the above preparation method.

The preparation method for a hollow radiator and the hollow radiator provided according to the present invention have at least the following advantages:
1. The preparation method of the present invention can improve the design freedom of products, and can realize hollow structures that cannot be removed by a traditional method, for example, those in complex three-dimensional shapes, such as under-cup and hollow structures, and those having special performance requirements.
2. The preparation method provided in the present invention can reduce the quality problems and cost problems caused by procedures such as secondary processing when preparing products of structures in complex three-dimensional shapes.
3. The hollow radiator obtained by the preparation method provided in the invention has good leakproofness and can guarantee no breakage and water leakage for a long time.
4. When a radiator of a hollow structure is prepared by the preparation method provided in the present invention, a more reasonable hollow structure can be designed, so that the heat dissipation contact area of the radiator is increased, and then the heat dissipation efficiency can be greatly improved.

Additional aspects and advantages of the invention will be set forth in part in the description that follows and in part will be obvious from the description, or may be learned by practice of the present invention.

BRIEF DESCRIPTION OF THE DRAWING

FIG. 1 illustrates an example flow chart of a preparation method for a hollow radiator.

DETAILED DESCRIPTION OF THE INVENTION

The present invention will be further described below in conjunction with specific embodiments and specific examples to provide better understandings of the present invention. It can be understood that such specific embodiments and specific examples are all illustrative to just explain the present invention and cannot be construed as limitations to the present invention.

An example of the present invention provides a preparation method of a hollow radiator, comprising the following steps:
1) providing a feed and an insert raw material;
2) molding the insert raw material into an insert;
3) placing the insert in a cavity of a mold, and filling the cavity with the feed by injection molding in such a manner that the insert is surrounded by the feed, thereby obtaining a green body with the insert;
4) performing debinding treatment on the green body with the insert to remove the insert, hereby obtaining the green body of a hollow structure; and
5) sintering the green body to obtain the hollow radiator.

The principle of the present invention can be briefly described as follows: firstly, an insert of a complex structure (this insert matches the shape of the hollow structure of a hollow radiator to be prepared) is fabricated, Next, the insert is placed in an MIM mold, and then injection molding is performed in the mold by a metal injection molding process, so that the insert is surrounded by a raw material (e.g., metallic copper) for forming the radiator to form a green body. Then, the insert within the green body is removed by debinding treatment so as to obtain the green body of the hollow structure. Finally, the hollow radiator is obtained by a sintering process.

Specifically, the preparation method for the hollow radiator provided in the present invention mainly comprises the following steps.

Step 1), Raw Materials Preparation

In the present invention, two raw materials are needed: one being an insert raw material for forming the insert, and the other being a raw material for forming the radiator, a feed.

In some examples of the present invention, the insert raw material can be polyformaldehyde (POM), polymethyl methacrylate (PMMA), or polystyrene (PS).

Since metallic copper has excellent heat-conducting property, the metal Cu (copper) is chosen as the material for forming the radiator in some examples of the present invention.

For example, in some examples of the present invention, the feed is obtained by mixing metal Cu powder and a binder in an internal mixer under the conditions of a rotating speed of 20-30 r/min and a temperature of 170-200° C. for 2-4 hours. It can be understood that the mixing process is well known by those of ordinary skill in the art and thus will not be redundantly described herein. Further, in some examples of the present invention, the particle size of the Cu powder ranges from 30 to 50 um.

It can be understood that the feed for the metal injection molding process can be prepared by various common methods in the art, which will not be specially limited herein and thus will not be redundantly described herein.

Further, in some examples of the present invention, the binder is at least one selected from paraffin wax (PW), beeswax, high-melting-point polyethylene (HDPE), low-melting-point polyethylene (LDPE), polypropylene (PP), polystyrene (EPS), polyformaldehyde (POM), and ethyl acetate (EVA).

Further, in some examples of the present invention, the volume content of the metal powder in the feed ranges from 55% to 65% to obtain a good injection molding effect.

Further, in some examples of the present invention, the feed can also be prepared into a granular feed. Thus, the obtained granular feed is convenient to transport, can be stored longer, and is not easy to agglomerate and conducive to the subsequent injection process.

It can be understood that the feed can be prepared into the granular feed by various common methods in the art. In some examples of the present invention, the mixed feed may be extruded twice into a flake shape and a bar shape and thus formed into the granular feed. It can be understood that the specific processes and methods of extrusion into the flake shape and the bar shape are well known by those skilled in the art, which will not be redundantly described herein.

Step 2), Insert Molding

It can be understood that the insert can be molded by various common methods, which will not be specially limited herein as long as the shape matching the desired hollow structure can be obtained.

In some examples of the present invention, the insert is molded by the injection molding process. For example, the insert material is injection-molded into the insert under an injection pressure of 40-60 MPa and at a temperature of 190-245° C., wherein the injection time is 5 seconds (the specific injection time can be determined by actual condition, for example, specifically subject to full injection).

Further, in sore examples of the present invention, h is further included to dry the insert raw material at 80-90° C. for 2-4 hours before molding the insert raw material into the insert. The use of the dried insert raw material is helpful for injection molding, and sticking of the insert raw material to the mold in injection module under the condition of high moisture content can be prevented.

Step 3), Molding a Green Body with the Insert

The injection molding process is used to prepare a hollow radiator in the present invention. Specifically, the insert obtained by molding in last step is placed in the cavity of the MIM mold, and then the feed is injected to fill the cavity of the mold and surround the insert so as to obtain the green body with the insert. In some examples of the present invention, the conditions of injection molding for the green body with the insert are: injection pressure of 50-70 MPa, temperature of 185-205° C., and injection time of 3-5 seconds.

To prevent the insert from melting in the MIM mold, in some examples of the present invention, the temperature of the material is below 200° C., and the temperature of the mold is below 120° C. It can be understood that to prevent the deformation of the insert in the MIM mold during the injection molding process, the support force for positioning the insert in the MIM mold needs to be guaranteed during the injection process.

Step 4), Removing the Insert

After the green body with the insert is obtained, debinding treatment is performed on the green body with the insert to remove the insert, thus obtaining the green body of the hollow structure. It can be understood that, in the preparation method provided in the present invention, the insert and part of the binder in the green body can be removed simultaneously by the debinding treatment.

In some examples of the present invention, the debinding treatment is a debinding treatment with a catalyst. Debinding with a catalyst means depolymerizing organic carrier molecules into smaller volatile molecules that have higher vapor pressure than other organic carrier molecules in the debinding process and can diffuse out of the green body rapidly. In some examples of the present invention, the catalyst used in the catalytic debinding treatment is oxalic acid. Further, in some examples of the present invention, the temperature for the catalytic debinding treatment ranges from 120 to 135° C., and a speed of feeding the catalyst is 2-3 g/min, thus guaranteeing complete dissolution of the insert and improving the yield of products.

In some examples of the present invention, the temperature for the catalytic debinding treatment is 130° C. The catalytic debinding treatment comprises: firstly carrying out debinding for 150 minutes at the catalyst feeding speed of 2 g/min, thereby guaranteeing that the green body is integrally changed into a porous structure at a low debinding speed without crazing; then, carrying out debinding for 240 minutes at the catalyst feeding speed of 3 g/min, i.e., increasing the debinding speed by increasing the acid feeding amount; and finally, carrying out debinding for 90 min at the catalyst feeding speed of 2 g/min to guarantee that the partial residual binder is completely removed.

In some examples of the present invention, solvent debinding is also included in the catalytic debinding treatment. The solvent debinding is a method of removing soluble components in the binder based on the principle that like organic molecules dissolve like organic molecules. In some examples of the present invention, the solvent used in the solvent debinding treatment is alcohol, dichloromethane, or ethyl acetate. In some examples of the present invention, the temperature for the solvent debinding treatment ranges from 20 to 30° C., and the debinding time ranges from 48 to 56 hours, thus guaranteeing complete dissolution of the insert and improving the yield of products.

Step 5), Sintering Molding

In some examples of the present invention, the highest temperature of sintering ranges from 980 to 1050° C. For example, in some examples of the present invention, the metal powder used as the feed is metal Cu powder, and the melding point of copper is 1080° C. Accordingly, the sintering is performed at the temperature close to the melting point so that the sintered sample can be more compact and higher in density. Thus, products having better properties can be obtained.

To improve the yield of products and prevent crazing and oxidation in the sintering process, in some examples of the present invention, the green body is sintered by a multi-stage sintering process, which specifically comprises heating the green body to 600° C. and maintaining the temperature for 60-90 min first, heating the green body to 800° C. and maintaining the temperature for 60-90 min afterwards, then heating the green body to 950° C. and maintaining the temperature for 30-60 min, and finally, heating the green body to the highest temperature and maintaining the temperature for 60-120 min, and naturally cooling the green body to room temperature to obtain the product.

In some examples of the present invention, the sintering is carried out in hydrogen atmosphere, and the pressure of the hydrogen atmosphere ranges from 50 to 86 KPa. A metal (e.g. copper) can be oxidized easily at a high temperature. Once an oxidation product is generated, the sintering shrinkage process of the copper powder will be hindered. In addition, the hydrogen is better than copper in reducibility and thus easier to combine with oxygen. Therefore, the use of the hydrogen atmosphere can prevent the copper from being oxidized by oxygen in the sintering process, thereby guaranteeing the continuity of the entire powder sintering.

Additionally, the present invention also provides a hollow radiator obtained by the above preparation method.

The present invention will be further described below with specific examples. The specific examples, however, are merely intended to illustrate, rather than limit, the present invention.

Example 1 (Using POM Material to Prepare an Insert in this Example)

A fed metal powder (Cu powder purchased from BASF company, with a particle size being 30 urn, a binder in the feed being POM, and a volume content of the Cu powder being 60%) was put into a granulator and mixed for 2 hours under the conditions of a rotating speed of 20 r/min and a temperature of 170° C. The mixed feed was granulated through extension into a flake shape and a bar shape, respectively, so that the feed could be further homogenized and compacted. Thus, a granular feed suitable for injection was obtained.

The POM material was dried at 80° C. for 4 hours, and then the dried POM material was poured into a hopper and injected into an insert shape, thereby obtaining a POM insert, wherein the injection pressure was 40 MPa, and the temperature was 190° C. with the injection time for 2 seconds (specifically subject to full injection).

Next, the obtained POM insert was cooled and put into the cavity of all MIM mold, and the above granular feed was injected into the cavity to obtain a green body with the insert, wherein the injection pressure was 50 MPa, and the temperature was 185° C. with the injection time for 3 seconds.

Then, the debinding treatment was performed on the obtained green body with the insert by using the catalytic debinding technique, thereby removing the insert in the green body and obtaining a porous green body of the hollow structure, wherein the temperature for the catalytic debinding treatment was 130° C., and the debinding time was 11 hours until the green body debinding rate was 8.0%. The specific parameters of the catalytic debinding process were set as shown in table 1.

TABLE 1

| Stage No. | Pre-flush | Debinding | | | Post-flush | | Unit |
|---|---|---|---|---|---|---|---|
| | 1 | 2 | 3 | 4 | 5 | 6 | |
| Stage Time | 45 | 150 | 240 | 90 | 90 | 45 | min |
| Temperature of Furnace Chamber | 130 | 130 | 130 | 130 | 130 | | ° C. |
| Fan Speed | 50% | 50% | 50% | 50% | 50% | 50% | r/min |
| Acid feeding Rate | | 2 | 3 | 2 | | | g/min |
| Temperature of Oxalic Acid Vaporizing Chamber | 180° C. | | Flue Temperature | 150° C. | Combustion Temperature | 680° C. | |

Finally, the above green body was sintered to obtain a hollow radiator, wherein the highest temperature of sintering was 1000° C., The specific sintering parameters were set as shown in table

TABLE 2

Suitable Furnace Model: tube furnace
Heating Curve

| Temperature Stage | Temperature Zone | Time | Sintering Process Atmosphere Control |
|---|---|---|---|
| Stage 1 | Room temperature→600° C. | 240 min | Hydrogen was passed during the whole process. |
| Stage 2 | Maintain the temperature at 600° C. | 90 min | |
| Stage 4 | 600° C.→800° C. | 60 min | |
| Stage 4 | Maintain the temperature at 800° C. | 60 min | |
| Stage 5 | 800° C.→950° C. | 45 min | |
| Stage 6 | Maintain the temperature at 950° C. | 30 min | |
| Stage 7 | 950° C.→the highest temperature | 90 min | |
| Stage 8 | Maintain the highest temperature | 60 min | |
| Stage 9 | Natural cooling | / | Hydrogen was passed continuously after temperature maintaining is finished, and the pressure was 86 KPa. |

Example 2 (Using PMMA Material to Prepare an Insert in this Example)

A fed metal powder (Cu powder purchased from BASF company, with a particle size being 50 urn, a binder in the feed being ethyl acetate, and a volume content of the Cu powder being 55%) was put into a granulator and mixed for 3 hours under the conditions of a rotating speed of 30 r/min and a temperature of 200° C. The mixed feed was granulated through extension into a flake shape and a bar shape, respectively, so that the feed could be further homogenized and compacted. Thus, a granular feed suitable for injection was obtained.

The PMMA material was dried at 90° C. for 3 hours, and then the dried PMMA material was poured into a hopper and injected into an insert shape, thereby obtaining a PMMA insert, wherein the injection pressure was 60 MPa, and the temperature was 245° C. with the injection time for 3 seconds (specifically subject to full injection).

Next, the obtained PMMA insert was cooled and put into the cavity of an MIM mold, and the above granular feed was injected into the cavity to obtain a green body with the PMMA insert, wherein the injection pressure was 65 MPa, and the temperature was 200° C. with the injection time for 4 seconds.

Then, the debinding treatment was performed on the obtained green body with the PMMA insert by using the solvent debinding technique, thereby removing the PMMA insert in the green body and obtaining the green body of the hollow structure. The temperature for the solvent debinding treatment was 20° C., and the debinding time was 56 hours (subject to that the PMMA insert was completely removed). Subsequently, the catalytic debinding treatment was performed on the green body of the hollow structure by using the catalytic debinding technique, thereby obtaining a porous green body of the hollow structure. The temperature for the catalytic debinding treatment was 120° C., and the debinding time was 11 hours until the green body debinding rate was 8.0%. The specific parameters of the catalytic debinding process were set as shown in table 3.

TABLE 3

| | Pre-flush | Debinding | | | Post-flush | | |
|---|---|---|---|---|---|---|---|
| Stage No. | 1 | 2 | 3 | 4 | 5 | 6 | Unit |
| Stage Time | 45 | 150 | 240 | 90 | 90 | 45 | min |
| Temperature of Furnace Chamber | 120 | 120 | 120 | 120 | 120 | | ° C. |
| Fan Speed | 50% | 50% | 50% | 50% | 50% | 50% | r/min |
| Acid feeding Rate | | 2 | 3 | 2 | | | g/min |
| Temperature of Oxalic Acid Vaporizing Chamber | 180° C. | | Flue Temperature | 150° C. | Combustion Temperature | 680° C. | |

Finally, the above green body was sintered to obtain a hollow radiator, wherein the highest temperature of sintering was 1050° C. The specific sintering parameters were set as shown in table 4.

TABLE 4

Suitable Furnace Model: tube furnace
Heating Curve

| Temperature Stage | Temperature Zone | Time | Sintering Process Atmosphere Control |
|---|---|---|---|
| Stage 1 | Room temperature →600° C. | 220 min | Hydrogen was passed during the whole process. |
| Stage 2 | Maintain the temperature at 600° C. | 60 min | |
| Stage 4 | 600° C.→800° C. | 90 min | |
| Stage 4 | Maintain the temperature at 800° C. | 80 min | |
| Stage 5 | 800° C.→950° C. | 30 min | |
| Stage 6 | Maintain the temperature at 950° C. | 60 min | |
| Stage 7 | 950° C.→the highest temperature | 60 min | |
| Stage 8 | Maintain the highest temperature | 120 min | |
| Stage 9 | Natural cooling | / | Hydrogen was passed continuously after temperature maintaining is finished, and the pressure was 50 KPa. |

Example 3 (Using PS Material to Prepare an Insert in this Example)

A fed metal powder (Cu powder purchased from BASF company, with a particle size being 40 urn, a binder in the feed being ethyl acetate, and a volume content of the Cu powder being 65%) was put into a granulator and mixed for 4 hours under the conditions of a rotating speed of 25 r/min and a temperature of 185° C. The mixed feed was granulated through extension into a flake shape and a bar shape, respectively, so that the feed could be further homogenized and compacted. Thus, a granular feed suitable for injection was obtained.

The PS material was dried at 85° C. for 2 hours, and then the dried PS material was poured into a hopper and injected into an insert shape, thereby obtaining a PS insert, wherein the injection pressure was 50 MPa, and the temperature was 220° C. with the injection time for 2.5 seconds (specifically subject to full injection).

Next, the obtained PS insert was cooled and put into the cavity of an MIM mold, and the above granular feed was injected into the cavity to obtain a green body with the PS insert, wherein the injection pressure was 70 MPa, and the temperature was 205° C. with the injection time for 5 seconds.

Then, the debinding treatment was performed on the obtained green body with the PS insert by using the solvent debinding technique, thereby removing the PS insert in the green body and obtaining the green body of the hollow structure. The temperature for the solvent debinding treatment was 30° C., and the debinding time was 48 hours (subject to that the PS insert was completely removed). Subsequently, the catalytic debinding treatment was performed on the green body of the hollow structure by using the catalytic binding technique, thereby obtaining a porous green body of the hollow structure. The temperature for the catalytic debinding treatment was 135° C., and the debinding time was 11 hours until the green body debinding rate was 8.0%. The specific parameters of the catalytic debinding process were set as shown in table 5.

TABLE 5

| | Pre-flush | Debinding | | | Post-flush | | |
|---|---|---|---|---|---|---|---|
| Stage No. | 1 | 2 | 3 | 4 | 5 | 6 | Unit |
| Stage Time | 45 | 150 | 240 | 90 | 90 | 45 | min |
| Temperature of Furnace Chamber | 135 | 135 | 135 | 135 | 135 | | ° C. |
| Fan Speed | 50% | 50% | 50% | 50% | 50% | 50% | r/min |
| Acid feeding Rate | | 2 | 3 | 2 | | | g/min |
| Temperature of Oxalic Acid Vaporizing Chamber | 180° C. | | Flue Temperature | | 150° C. | Combustion Temperature | 680° C. |

Finally, the above green body was sintered to obtain a hollow radiator, wherein the highest temperature of sintering was 980° C. The specific sintering parameters were set as shown in table 6.

TABLE 6

Suitable Furnace Model: tube furnace
Heating Curve

| Temperature Stage | Temperature Zone | Time | Sintering Process Atmosphere Control |
|---|---|---|---|
| Stage 1 | Room temperature →600° C. | 220 min | Hydrogen was passed during the whole process. |
| Stage 2 | Maintain the temperature at 600° C. | 80 min | |
| Stage 4 | 600° C.→800° C. | 80 min | |
| Stage 4 | Maintain the temperature at 800° C. | 90 min | |
| Stage 5 | 800° C.→950° C. | 60 min | |
| Stage 6 | Maintain the temperature at 950° C. | 45 min | |
| Stage 7 | 950° C.→the highest temperature | 70 min | |
| Stage 8 | Maintain the highest temperature | 100 min | |
| Stage 9 | Natural cooling | / | Hydrogen was passed continuously after temperature maintaining is finished, and the pressure was 60 KPa. |

While the examples of the present invention are illustrated and described, it would be appreciated by those skilled in the art that various changes, alterations, replacements and modifications can be made to these examples without departing from the principle and objective of the present invention, the scope of which is defined by the claims and their equivalents.

The invention claimed is:

1. A preparation method for a hollow radiator, comprising the following steps:
   1) providing a feed and an insert raw material;
   2) drying the insert raw material at 80-90° C. for 2-4 hours and molding the insert raw material into an insert;
   3) placing the insert in a cavity of a mold, and filling the cavity with the feed by injection molding in such a manner that the insert is surrounded by the feed, thereby obtaining a green body with the insert;
   4) performing debinding treatment on the green body with the insert to remove the insert, thereby obtaining the green body as a hollow structure; and
   5) sintering the green body to obtain a hollow radiator.

2. The preparation method of claim 1, wherein the feed in the step 1) is obtained by mixing a metal powder and a binder under the conditions of a rotating speed of 20-30 r/min and a temperature of 185-200° C. for 2-4 hours; and the volume content of the metal powder in the feed ranges from 55% to 60%.

3. The preparation method of claim 2, wherein the step 1) further comprises extruding the feed twice into a flake shape and a bar shape, thereby obtaining granules.

4. The preparation method of claim 2, wherein the metal powder is Cu powder, with a particle size of the Cu powder ranging from 30 to 50 μm; and the binder is at least one selected from paraffin wax, beeswax, polyethylene, polypropylene, polystyrene, polyformaldehyde, and ethyl acetate.

5. The preparation method of claim 1, wherein the insert raw material is polyformaldehyde (POM), polymethyl methacrylate (PMMA), or polystyrene (PS).

6. The preparation method of claim 1, wherein the debinding treatment in the step 4) is a catalytic debinding treatment; a catalyst used in the catalytic debinding treatment is oxalic acid; a temperature for the catalytic debinding treatment ranges from 120 to 135° C.; and a speed of feeding the catalyst is 2-3 g/min.

7. The preparation method of claim 6, wherein a solvent debinding treatment is also included before the catalytic debinding treatment; a solvent used in the solvent debinding treatment is alcohol, dichloromethane, or ethyl acetate; and the solvent debinding treatment is performed at a temperature of 20-30° C. for 48-56 hours.

8. The preparation method of claim 1, wherein in the step 5), the green body is sintered in hydrogen atmosphere to obtain the hollow radiator; the pressure of the hydrogen atmosphere ranges from 50 to 86 KPa; and the highest temperature of sintering ranges from 980 to 1050° C.

9. The preparation method of claim 8, wherein the sintering comprises heating the green body to 600° C. and maintaining the temperature for 60-90 minutes first, heating the green body to 800° C. and maintaining the temperature for 60-90 minutes afterwards, then heating the green body to 950° C. and maintaining the temperature for 30-60 minutes, and finally, heating the green body to the highest temperature and maintaining the temperature for 60-120 minutes, and naturally cooling the green body to room temperature.

* * * * *